US006236332B1

(12) United States Patent
Conkright et al.

(10) Patent No.: US 6,236,332 B1
(45) **Date of Patent: *May 22, 2001**

(54) CONTROL AND MONITORING SYSTEM

(75) Inventors: Gary W. Conkright, Naperville; Robert M. Beckman, West Chicago, both of IL (US); Todd Clark, Valpraiso, IN (US)

(73) Assignee: Profile Systems, LLC, Merrillville, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/955,808

(22) Filed: Oct. 22, 1997

(51) Int. Cl.[7] .......................... G05B 23/02; G08C 19/16; G08C 17/00

(52) U.S. Cl. ............................... 340/825.06; 340/825.06; 340/825.08; 340/825.17; 340/870.01; 340/870.28

(58) Field of Search ......................... 340/825.06, 825.08, 340/825.17, 825.22, 825.54, 825.69, 825.72, 870.01, 870.12, 870.13, 870.28; 364/328.11; 379/102.01, 102.05, 106.03

(56) References Cited

U.S. PATENT DOCUMENTS

| | | | | |
|---|---|---|---|---|
| 4,208,630 | | 6/1980 | Martinez | 375/7 |
| 4,279,012 | | 7/1981 | Beckendorff et al. | 364/104 |
| 4,342,986 | | 8/1982 | Buskirk et al. | 340/539 |
| 4,454,509 | | 6/1984 | Buennagel et al. | 340/825.69 |
| 4,881,070 | * | 11/1989 | Burrowes et al. | 340/870.02 |
| 4,962,522 | | 10/1990 | Marian | 379/5 |
| 4,967,194 | * | 10/1990 | Haruki | 340/825.44 |
| 5,089,814 | | 2/1992 | DeLuca et al. | 340/825.49 |
| 5,254,908 | | 10/1993 | Alt et al. | 315/312 |
| 5,528,507 | * | 6/1996 | McNamara et al. | 364/483 |
| 5,590,179 | * | 12/1996 | Shincovich et al. | 379/107 |
| 5,886,647 | * | 3/1999 | Badger et al. | 340/825.69 |
| 5,897,607 | * | 4/1999 | Jenney et al. | 702/62 |
| 5,898,384 | * | 4/1999 | Alt et al. | 340/825.36 |

* cited by examiner

*Primary Examiner*—Michael Horabik
*Assistant Examiner*—M. Phan
(74) *Attorney, Agent, or Firm*—Cook, Alex, McFarron, Manzo, Cummings & Mehler Ltd.

(57) ABSTRACT

A two-way wireless communications system for permitting the control, monitoring and collection of data from electrical apparatus includes a host computer, control and monitoring units remotely located from the host computer, and subscriber software for establishing communication protocol with each unit. The host computer includes a customer interface gateway which handles communications from the subscriber software to the host system, a wireless service gateway which handles all communications with the remotely located units, and a product data processor for processing data obtained from either a customer via the subscriber software or a particular remote unit. The subscriber software permits customers to have desktop control of their electrical apparatus associated with a remote unit. Each remote unit contains a motherhood, power supply, and modem. Each unit is capable of real-time monitoring and control of the electrical apparatus associated with the unit.

16 Claims, 7 Drawing Sheets

CONTROL AND MONITORING SYSTEM

BACKGROUND OF THE INVENTION

The present invention relates generally to a system for controlling and monitoring electrical apparatus and, more particularly, to a system which utilizes two-way wireless communications to control, monitor and collect data from electrical apparatus.

The present manual methods used for controlling and monitoring electrical apparatus are expensive and time consuming. For example, a person or business having remotely located electrical apparatus typically needs to manually check on such apparatus to determine whether the apparatus is operating properly. This gets particularly expensive when the electrical apparatus is located at geographically diverse positions. Frequently, in such situations, employees are hired to travel between each apparatus site to examine each apparatus and report on the status of the apparatus.

A control and monitoring system capable of not only controlling such diversely located apparatus, but also of monitoring and collecting data from the apparatus, would obviate the need for such field inspections. Also, such a control and monitoring system has the potential of optimizing the efficiency of the network of apparatus and significantly reducing energy consumption. There are many applications which would benefit from the use of such a control and monitoring system, and although the present invention is described in the context of several particular applications, the invention should not be construed as being limited to these applications.

One application for which the present invention could be advantageously used is the monitoring of utility systems. The conventional method of monitoring and collecting electrical energy consumption is to manually read a meter located at a site by sending personnel to that site. The present invention provides for a remote reading of the monthly electrical consumption at a particular site, thereby eliminating the need to manually read the meter at each site. The invention is also capable of discontinuing service to a utility customer when so commanded by the utility company.

Another application for the present invention is monitoring traffic through a so-called automobile drive-through line of a fast food type restaurant. In particular, certain data such as the time spent by each customer waiting for his/her order, could obtained at a central monitoring facility.

Another potential application for the present invention is the monitoring of the quality of gasoline at fuel stations. Again, the conventional method has been to send personnel to each station to test each gasoline holding tank. The present invention provides for quality, and quantity testing of a holding tank from a remote location. Again, cost and time are saved.

Another use of the present invention is the monitoring of the remaining capacity of a remotely located trash compactor. From such a reading, the invention is capable of activating and deactivating the compactor, as desired.

Other applications for the present invention include lighting systems, climate control systems, irrigation systems, and traffic control systems. The lighting applications include the control and monitoring of household and business lights, airport runway lights, and signboards, such as those typically utilized for advertising goods and services. These include triface signboards, mechanical signboards, and multiple face signboards, among others.

Accordingly, it is a general object of the present invention to provide a control and monitoring system which establishes two-way wireless communication between a host computer and a control and monitoring unit located at a site remote from the host computer.

It is a more specific object of the present invention to provide a system which establishes two-way wireless communications for controlling and monitoring an electrical apparatus remotely located from a host computer.

It is still another object of the present invention is to provide remote control and monitoring units which are stand-alone units and are independently capable of controlling and monitoring electrical apparatus.

Still another object of the present invention is to provide a system which establishes two-way wireless communications and permits collection of data regarding the operating conditions of electrical apparatus.

These and other objects, features and advantages of the present invention will be clearly understood through a consideration of the following detailed description.

SUMMARY OF THE INVENTION

According to the present invention, there is provided a system for controlling, monitoring, and collecting data from electrical apparatus. The system comprises a host computer having a memory for storing data regarding the operating conditions of the electrical apparatus, a processor for processing such data and input/output ports which allow the host computer to communicate with peripherals and a plurality of controlling and monitoring units remotely located from the host computer. The system further includes the control and monitoring units, each unit being associated with electrical apparatus for controlling, monitoring and collecting data from the same. The control and monitoring units communicate with the host computer over a wireless network while performing those functions.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
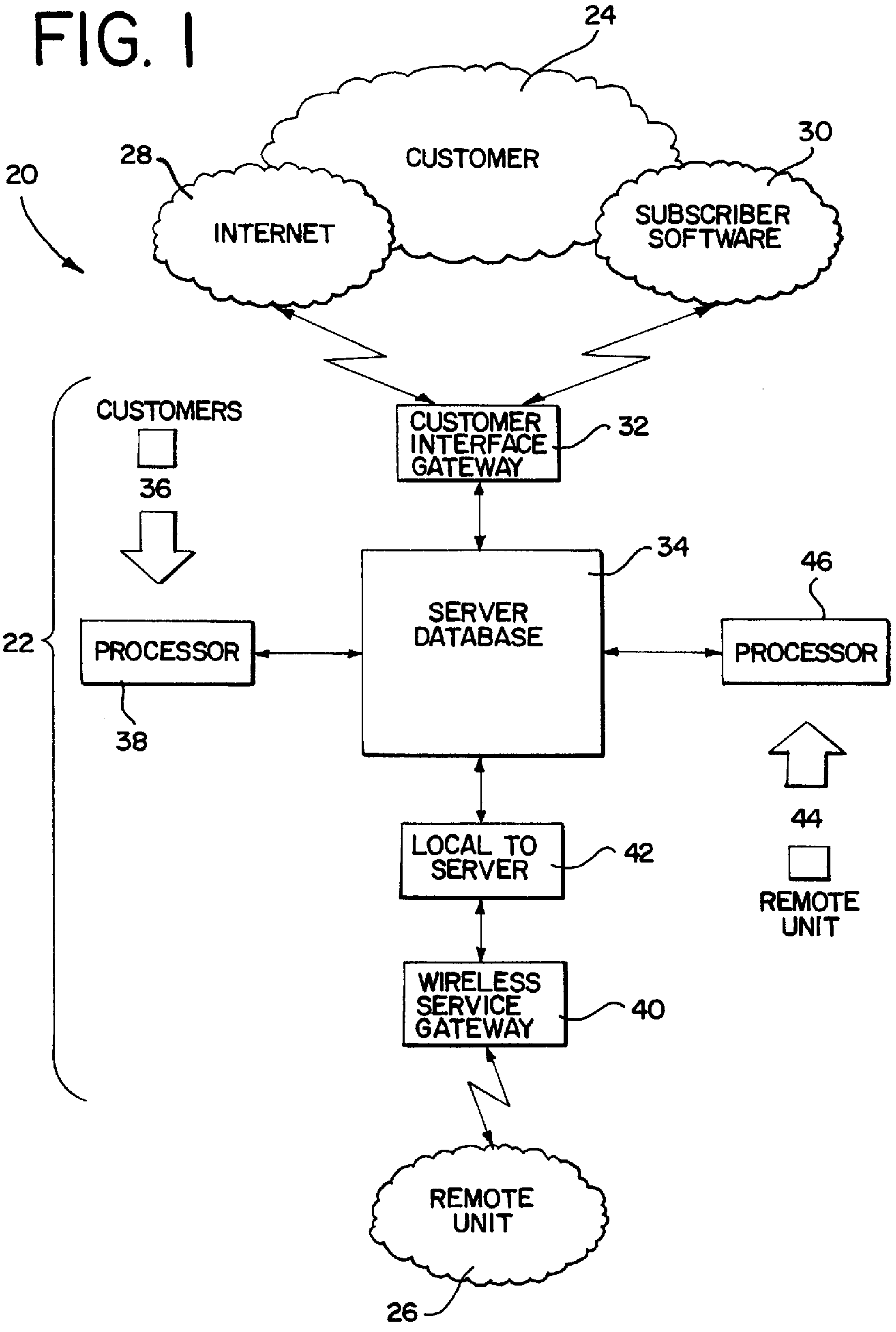
FIG. 1 is a simplified functional block diagram of the control and monitoring system of the present invention showing the communication links between the host computer, the customer, and the control and monitoring units.

Referring to the Figures, and particularly to FIG. 1, there is shown a control and monitoring system generally designated by reference numeral 20 which utilizes two-way wireless communications in accordance with the principles of the present invention. FIG. 1 depicts this control and monitoring system 20 and shows the data communication links between a host computer 22, customers 24, and each remote unit 26 of the present invention. Each customer 24 is capable of communicating with the host computer 22 through the Internet 28, subscriber software 30, or through other communication media including, but not limited to, a direct dial-up phone line, facsimile, paging, e-mail, or even human-to-human contact. The subscriber software 30 is adapted for each application (e.g., monitoring utilities, monitoring traffic flow, monitoring lighting, etc.), and the customers 24 install the software on a personal computer (PC) at their home or office. This gives the customers desktop control of their applications and allows the customers to create a database on their computers for each remote unit within their particular application. Data is preferably transmitted between each customer's computer and the host computer 22 via telephone lines and modems.

A customer interface gateway 32 permits full duplex communication between the customer and host computer 22. When data is sent from the customer to the host computer, the data is stored in a server database 34. Inbound messages 36 from customers may also be routed through a customer interface gateway product data processor 38. This processor 38 processes data received from a customer 24 and periodically scans the data for commands from the subscriber software 30.

Each remote unit 26 communicates with the host computer 22 via the wireless service gateway 40. This gateway 40 permits communication with the local server database gateway 42. Inbound messages 44 received from the remote unit 26 may also be transmitted through a wireless service gateway product data processor 46 to host computer 22. This processor 46 processes data received from the remote unit 26 and periodically scans the data for inbound messages from the remote unit for processing. Auxiliary components of the host system 22 then relay data to the appropriate end receivers,.and provide for a notification routine which may be, for example, conducted through e-mail, facsimile, or paging networks.

The host computer 22 is on line, runs continuously, and includes auxiliary power units for back up power supply. Computer 22 activates and deactivates the customer applications and stores "Alert" notification signals, as necessary. Computer 22 also sends commands to each remote unit 26. Computer 22 further communicates with the remote units 26 regularly, and can poll them to inquire if any "Alert" signals have been generated, or if any other performance problems are present within the system. Computer 22 also scans and processes new commands and communicates with the remote units 26 through a wireless paging network, for example.

When a paging network is used for these purposes, the commands are preferably sent in a protocol consisting of serially transmitted frames. Two different protocol may be used for sending and receiving information, each having two layers. One layer is application independent and defines the type of interaction between each remote unit 26 and computer 22 at the application level. The second layer of protocol is application dependent and defines additional information. The protocol is structured so that many types of information can be sent in the same packet of data. Each frame contains different information such as customer identification bits, product identification bits, remote unit 26 identification bits, electrical apparatus identification bits, etc.

Figure 2:
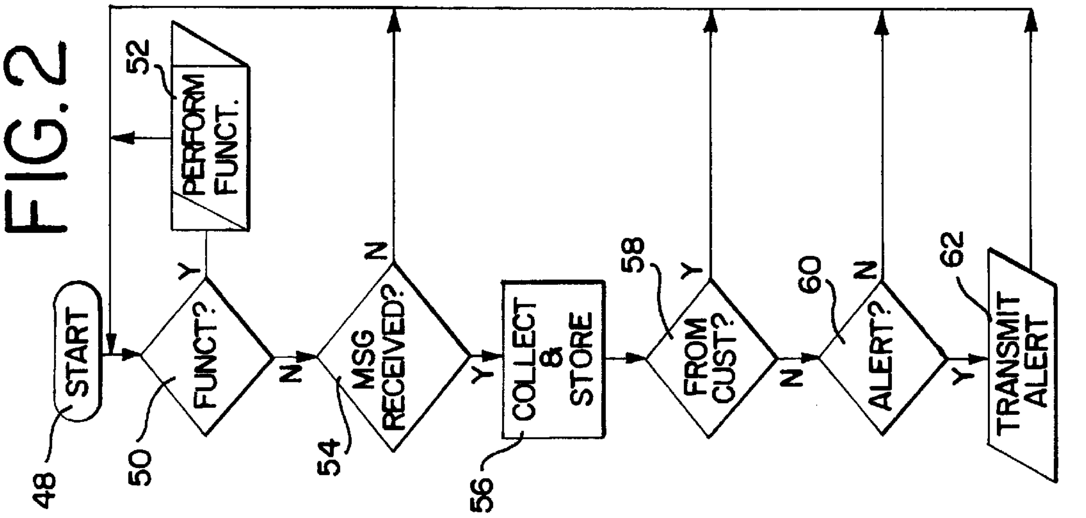
FIG. 2 is a simplified logic diagram of the operation of the host computer of the control and monitoring system of the present invention.

Referring now to FIG. 2, the operation of computer 22 is shown in logic diagram form. The operation of the computer begins at terminal block 48. The computer then determines, at block 50, whether it needs to perform a particular function. The function to be performed can be, for example, transmitting a command signal to a remotely located control and monitoring unit 26 (see FIG. 1), thereby commanding that remote unit to activate or deactivate its associated electrical apparatus. While making this determination at block 50, computer 22 is in its so-called comparison mode.

If computer 22 needs to perform a function, it does so at block 52 and then reenters its comparison mode. If not, computer 22 determines, at decision block 54, whether it has received a message from an external source. If not, the computer reenters its comparison mode. If so, the computer receives the message, processes it and stores it in its memory unit at block 56 so that the data can be accessed at a future time.

Thereafter, computer 22 determines at decision block 58, whether the message was sent by a customer or from a different source (such as a remote unit 26 or service personnel at a job site). If the received message was sent by a customer, no alert notification subroutine need be performed and the computer reenters its comparison mode. However, if the received message was not sent by a customer, the computer determines, at decision block 60, whether it needs to perform an alert notification subroutine. If the computer needs to perform an alert notification subroutine, it does so at block 62 and then returns to its comparison mode. If not, the computer returns immediately to its comparison mode.

Figure 3:
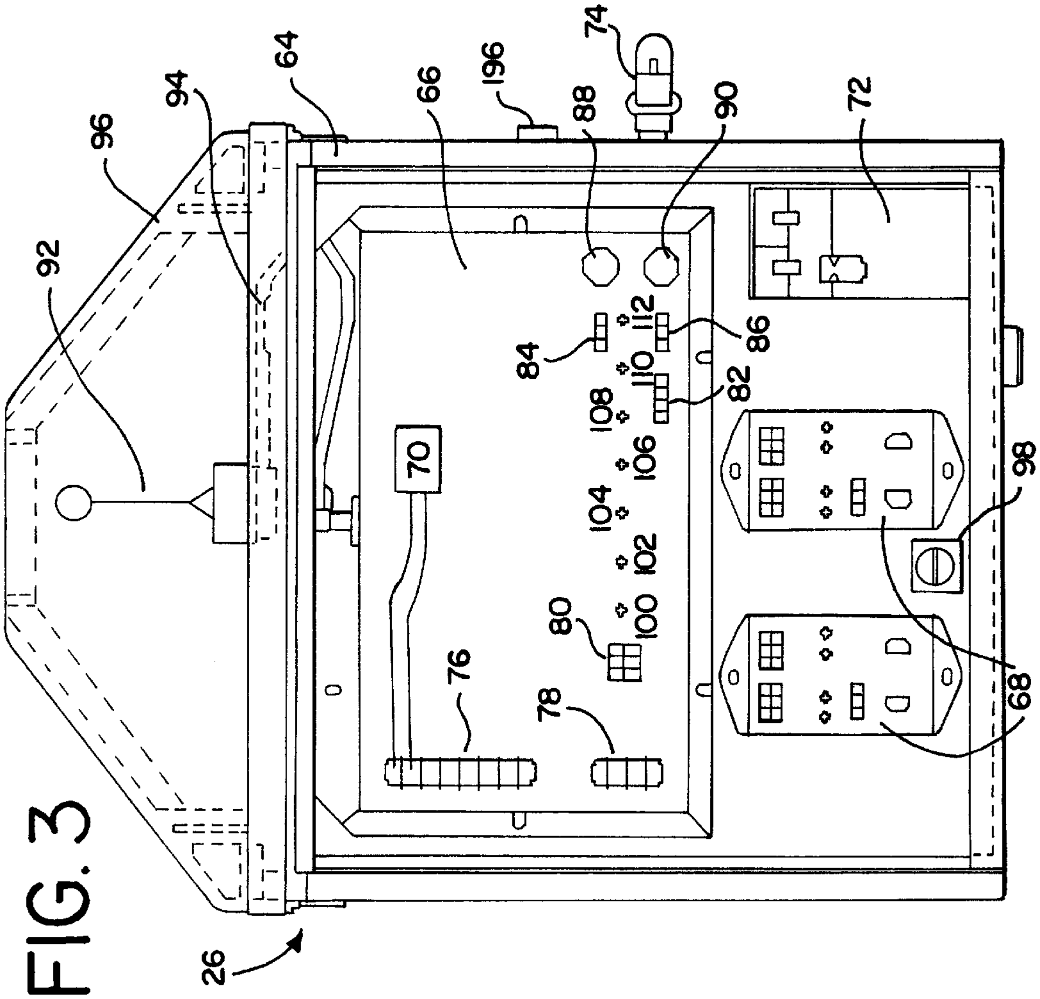
FIG. 3 is a front elevational view of a remotely located control and monitoring unit used with the control and monitoring system of the present invention.

A remote unit 26 of the type preferably used with the system of the present invention is shown in FIG. 3. As shown, the unit 26 is self-contained and includes a housing 64. A control or logic box 66, two relay/sensor modules 68, AC line sensors 70, and a back up power supply in the form of a battery 72 are all preferably included within housing 64. Although not shown in FIG. 3, a cover or door is preferably included as a portion of housing 64. This cover is secured by an assembly or latch 74 when it is closed and the latch includes a locking mechanism of a type well known in the art. As will be apparent, the cover or door assembly protects the components of remote unit 26 from the outside environment.

The control or logic box 66 contains a processor board, a power supply, and a two-way radio/modem. An AC sensor terminal strip 76 and AC power feed terminal strip 78 are also preferably included within control box 66. As shown, the top portion of housing 64 contains a relay/sensor module port 80, a battery port 82, a port 84 for a push button, and a service switch port 86. There are also two push button switches 88, 90. Switch 88 is labeled CAL and permits calibration of the system; switch 90 is labeled SVC and permits service of the electrical apparatus associated with unit 26.

An antenna 92 is preferably mounted on housing 64 in a manner well known in the art. Antenna 92 permits control box 66 to transmit and receive electromagnetic signals, as desired. Antenna 92 is electrically connected to the processor board of control box 66 by a transmission line shown in the form of coaxial cable 94. Antenna 92 is protected from the outside environment by a plastic shroud 96. A ground bolt 98 is also provided within housing 64 to enable the remote unit 26 to be properly grounded.

Included as part of the circuitry within logic box 66 are seven verification light-emitting diodes (LEDS) 100–112. LED 100 comprises a transmit indicator and is normally off. When it flashes, LED 100 indicates that the remote unit 26 is receiving or transmitting data across the wireless network. LEDS 102, 104 indicate the status of first and second alternating current power lines, respectively, during use of the AC line sensors 70. Each LED 102, 104 is illuminated while AC power is present on its respective line, and it will turn off during a power failure condition. LED 106 comprises a calibrate LED and illuminates whenever service personnel depress push-button calibration switch 88. LED 108 comprises a network contact LED switch and will illuminate throughout the interval of time when there is sufficient radio contact with the wireless network. LED 110 comprises a battery test indicator and will illuminate at all times except during the time interval that the unit 26 performs a battery test. While the unit 26 performs a battery test, LED 106 will flash. LED 112 comprises a power indicator and remains illuminated while AC power is applied to unit 26.

Figure 4:
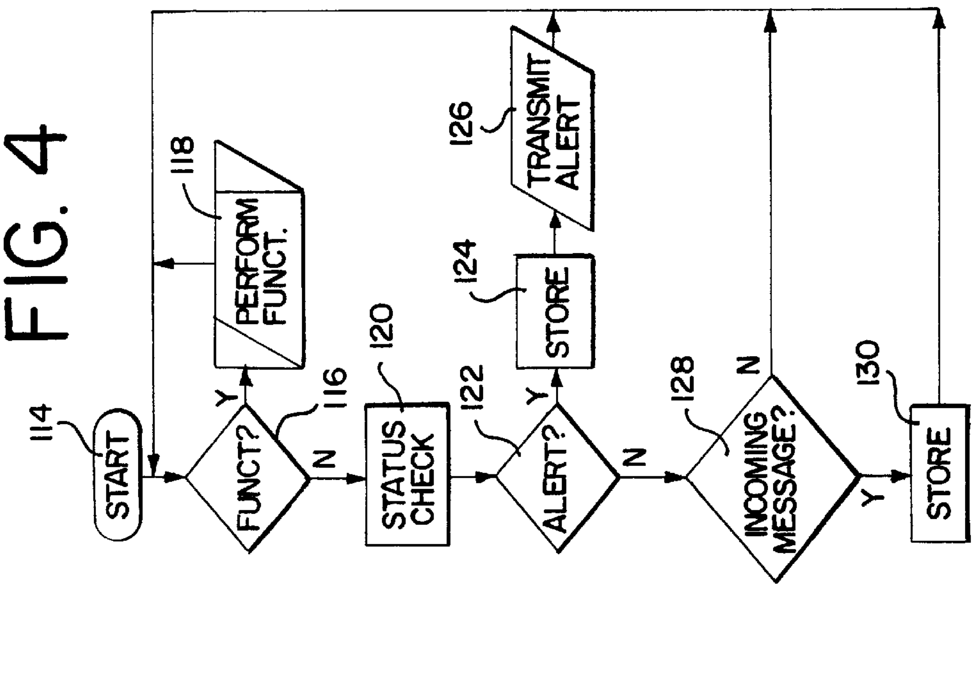
FIG. 4 is a simplified logic diagram of the operation of the remote unit of the control and monitoring system of the present invention.

Referring now to FIG. 4, there is shown the operation of a control and monitoring unit 26 in logic diagram form. The operation of the remote unit 26 begins at block 114. The remote unit first determines, at decision block 116, whether it needs to perform one of its many available functions. At this point, remote unit 26 is in its comparison mode. If the remote unit needs to perform a function, it does so at block 118 and then reenters its comparison mode.

It not, remote unit 26 performs an internal status check at block 120 to determine both its own operating condition and that of its associated electrical apparatus. Thereafter, the remote unit determines, at decision block 122, whether it has detected an alert condition based on the status check performed at block 120.

If so, remote unit 26 stores the alert signal data in its internal memory at block 124 and then transmits an alert notification signal to the host computer 22 at block 126 before reentering its comparison mode.

If no alert condition is detected, the remote unit determines, at block 128, if it has received an incoming message. If so, it collects and stores the message in its internal memory at block 130 before reentering its comparison mode. If not, it simply reenters its comparison mode.

As previously discussed, the remote unit 26 of the present invention can be used in a number of applications and may control, monitor and collect data from a number of associated electrical apparatus. The preferred control and monitoring system has been generally described above and it should be apparent that the system may be used in a wide variety of controlling and monitoring applications. Nevertheless, in the following description, the system will be described as being used to control, monitor and collect data from remotely located lights, in particular signboard lights. It will be understood that the following description is for illustrative purposes only and while it does embody the principles of the present invention, this invention is in no way limited to a single application.

Figure 5:
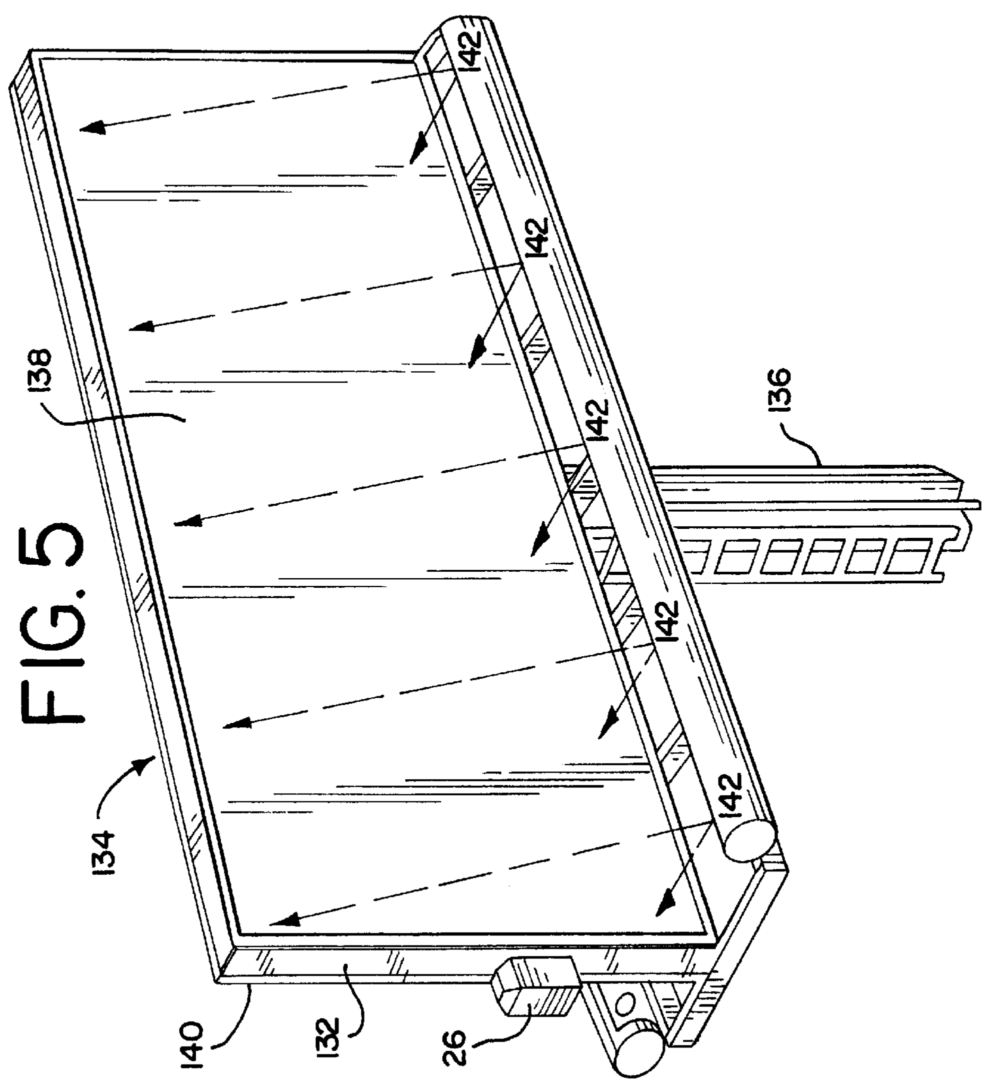
FIG. 5 is a perspective view of a dual face signboard showing the remote unit of FIG. 3 positioned to illuminate the sides of the signboard, as desired.

Referring now to FIG. 5, there is shown the control and monitoring system 20 in an embodiment adapted to control, monitor and collect data from signboard light sources. The remote unit 26 is shown mounted to the side 132 of a signboard 134. The illustrated signboard 134 includes a pole 136, a first or front face 138, and a second or back face 140. Faces 138, 140 are each illuminated by five light sources 142. Each light source 142 illuminates a proportional share of its respective face.

The logic box 66 of the remote unit 26 is programmed to accurately keep track of Greenwich Mean Time on its internal clock while it also automatically calculates and makes the required adjustments for daylight Savings Time and the Diurnal Cycle (dusk/dawn). This is accomplished in part because the unit knows its location, namely, its latitude and longitude coordinates, and has those locations stored in its internal memory. Because the unit 26 knows the exact time based on its location, the customer 24 can program and thereby control and monitor the electrical apparatus associated with the unit. For instance, the customer 24 can command unit 26 to activate its associated electrical apparatus at a first desired time and later deactivate it at a second desired time. The first and second desired times may be based on standard clock time (e.g. 6:54 a.m. EST—on; 8:23 p.m. EST—off, for example), the diurnal cycle, or any combination of the two.

Figure 6:
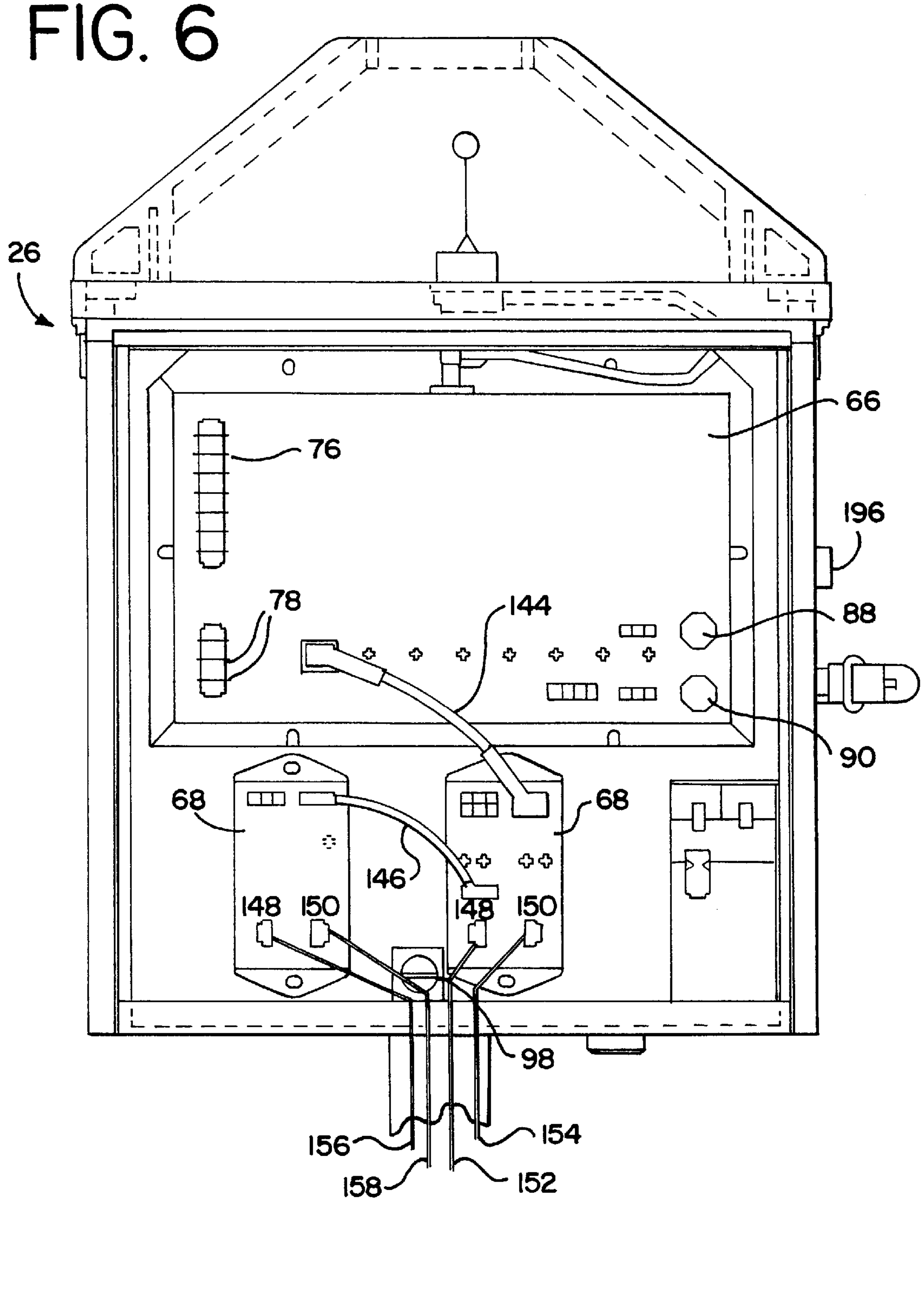
FIG. 6 is a front elevational view of the remote unit of FIG. 3 shown wired to control and monitor a single face signboard.

Referring now to FIG. 6, the remote unit 26 is shown as being wired to control and monitor a single face signboard. In this case, two relay/sensor modules 68 are used. A communication cable 144 connects the logic box 66 to the first relay/sensor module and an auxiliary cable 146 connects the first relay/sensor module to the second relay/sensor module, as shown. As shown, each relay/sensor module 68 includes a line receptacle 148 and a load receptacle 150 to receive electrical lines and thereby establish electrical connection with an associated AC power line and the associated electrical apparatus (e.g., signboard light source 142), respectively. For a single face signboard set-up, the line receptacle 148 of the first relay is connected with an electrical line 152 and circuit breaker (not shown) of the second AC power line. The load receptacle 150 of the first relay is connected by an electrical line 154 to the electrical apparatus (not shown) associated with the first relay. Similarly, the line receptacle 158 of the second relay is connected by an electrical line 148 and a circuit breaker (not shown) for the first AC power line. The load receptacle 150 of the second relay is connected with an electrical line 158 and the electrical apparatus (not shown) associated with the second relay.

Figure 7:
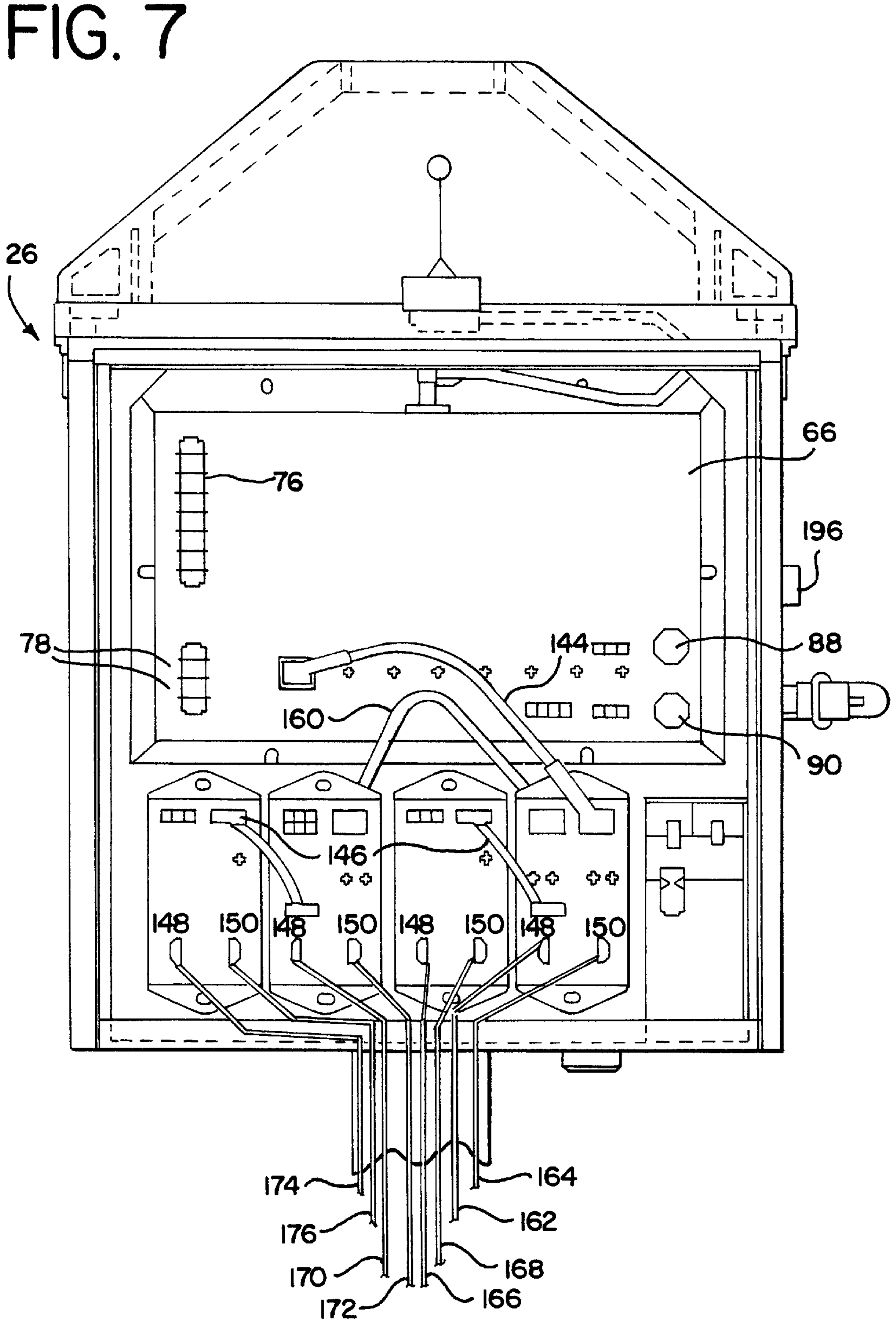
FIG. 7 is a front elevational view of the remote unit of FIG. 3 shown wired to control and monitor a dual face signboard.

If the remote unit 26 is used to control a dual face signboard, the wiring diagram shown in FIG. 7 will preferably be used. As shown, the wiring arrangement for a dual face signboard is somewhat similar to the arrangement for a single face signboard. A communication cable 144 connects the logic box 66 to a first relay, and auxiliary cables 146 connect the first and second relays for each face. The difference lies in the use of a separation cable 160 which connects the first relay of the first face of the signboard to the first relay of the second face of the signboard. As is described in further detail, the separation cable 160 permits designation of relay sets for each face of a signboard. This is particularly advantageous during system set-up and operation.

In the dual face signboard arrangement, the line receptacle 148 of the first relay is connected with an electrical line 162 and a circuit breaker (not shown) for the first AC power line. The load receptacle 150 of the first relay is connected with an electrical line 164 for the electrical apparatus (not shown) associated with the first relay. The line receptacle 148 of the second relay is connected with an electrical line 166 and a circuit breaker (not shown) for the second AC power line. The load receptacle 150 of the second relay is connected with an electrical line 168 for the electrical apparatus (not shown) associated with the second relay. The line receptacle 148 of the third relay is connected with an electrical line 170 for a circuit breaker (not shown) for the second AC power line. The load receptacle 150 of the third relay is connected with an electrical line 172 for the electrical apparatus (not shown) associated with the third relay. The line receptacle 148 of the fourth relay is connected with an electrical line 174 for a circuit breaker (not shown) for the first AC power line. The load receptacle 150 of the fourth relay is connected with an electrical line 176 for the electrical apparatus (not shown) associated with the fourth relay.

Figure 8:
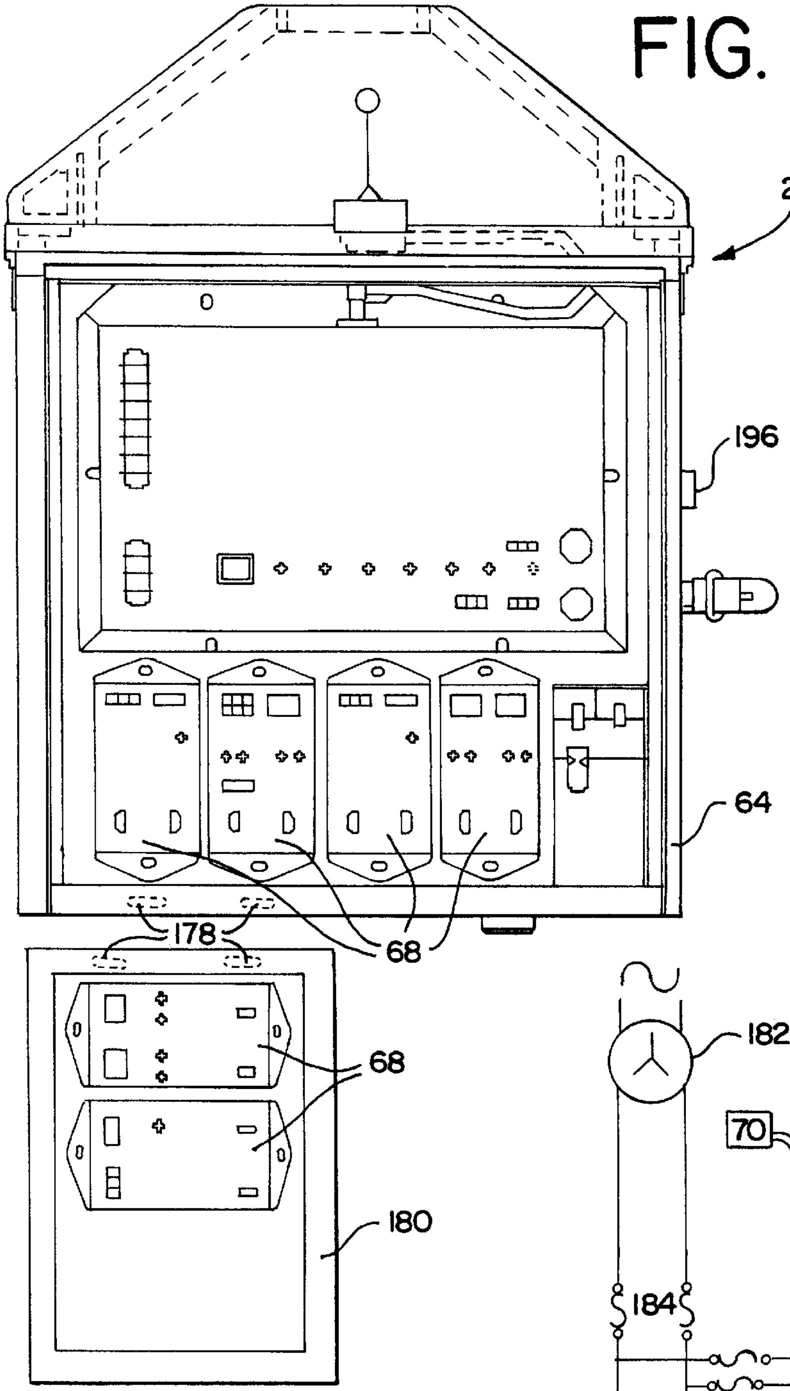
FIG. 8 is a front elevational view of the remote unit shown with an auxiliary relay cabinet used to permit control and monitoring of electrical apparatus comprising a relatively large electrical load.

More than four relays 68 may be required for some applications. In signboard applications, each face of the signboard typically requires two relays, depending on the electrical load of the light sources, so in multi-face signboard applications with signboards having three or more faces, an expansion cabinet may be needed to house additional relays. FIG. 8 shows an embodiment of the present invention implementing a relay expansion cabinet. The housing 64 of the remote unit 26 preferably includes a number of conduit punch-out portions 178 which enable conduit to connect the housing with an expansion cabinet 180. The expansion cabinet 180 is also equipped with conduit punch-out portions 178 to permit this connection. The wiring scheme for the relays 68 contained in the expansion cabinet 180 is identical to the connections previously described to provide a robust system.

Additional novel features of the present invention will now be discussed as they pertain to the use of the system in a signboard application. Again, it will be understood that such features are not intended to be limited to only a signboard application, but they may be used in other applications as well.

During set-up of the remote unit 26 at an established signboard site, the system 20 will automatically determine the number of signboard faces that the remote unit is to control and monitor. To achieve this feature, the host computer 22 polls each of the relays 68 associated with a particular remote unit 26. During the preferred polling scheme, the host computer 22 polls each remote unit 26. The first relay of the polled remote unit 26 responds to the poll by initiating an answer back routine. Upon receipt of an answer signal, the host computer 22 again polls the remote unit 26. If additional relays 68 are present, they each respond to their respective polls by initiating answer back routines. Each successively polled relay responds through the previously polled relays and indicates whether it is connected to a previously polled relay through an auxiliary cable 146, to another relay through a separation cable 160, directly to the logic box 66 through a communication cable 144, or any combination of the foregoing. Each successively polled relay 68 will initiate an answer back routine in this fashion. When the last relay 68 answers back, the host computer 22 stores data regarding the number of relays, the number of faces, and number of electrical apparatus controlled and monitored by the remote unit 26 at its site.

After this set-up routine is completed, the system 20 is ready to perform its calibration routine. The calibrate push-button switch 88 included within logic box 66 will activate the electrical apparatus associated with remote unit 26 for a predetermined period of time (approximately twenty minutes for the signboard application) so that the current drain of the connected apparatus (i.e., load) reaches its steady state operating condition. The steady state current drain is then measured and stored for later use during the monitoring of the electrical apparatus.

During monitoring of the operating conditions of its associated electrical apparatus, the remote units 26 periodically measure the current delivered to the apparatus. If the measured current differs from the stored steady state current drain for the apparatus by more than a threshold value, the remote unit 26 detects a failure condition. Alternatively, the host computer may periodically poll each remote unit 26 to command that unit to check for the occurrence of a failure condition of the electrical apparatus associated with the polled unit.

If a failure condition is detected, the level of current delivered to the electrical apparatus is continually monitored and measured throughout a predetermined period of time referred to as a validation period. The level of current may be measured by the remote unit 26 independently or by polling signals received from the host computer 22 commanding the unit 26 to conduct a measurement of that current level. If a failure is detected during each current measurement taken throughout the validation period, an alarm signal is transmitted to the host computer 22, indicating that there has been at least a partial failure of the electrical apparatus. Measurement of the current then continues until the current level rises so that it is once again within the threshold range of the steady state value of the current drain. At that time, an alarm restore signal is transmitted to the host computer 22, indicating remedy of the partial failure condition.

If any of the measurements during the validation period indicate that a failure condition is not present, the above-described alarm signal is not sent to the host computer 22 and periodic measurement resumes until the remote unit 26 detects a subsequent failure condition.

The present invention is also capable of distinguishing failure conditions indicating low current or partial failure from those indicating no current or total failure. A complete power failure will also trigger detection of a failure condition. A power failure may occur for any number of reasons, and because of this, each remote unit 26 is equipped with a back up power supply shown as battery 72. In the case of such a failure, it would be advantageous to know, and the present invention provides for, a determination of whether the failure was due to power line failure or merely a tripped circuit breaker. If the outage is due to a tripped circuit breaker, service personnel can be dispatched to the outage site immediately so that the involuntary deactivation time of the electrical apparatus is kept to a minimum. By having the ability to determine the cause of a total failure condition, the condition may be remedied in a timely manner.

Figure 9:
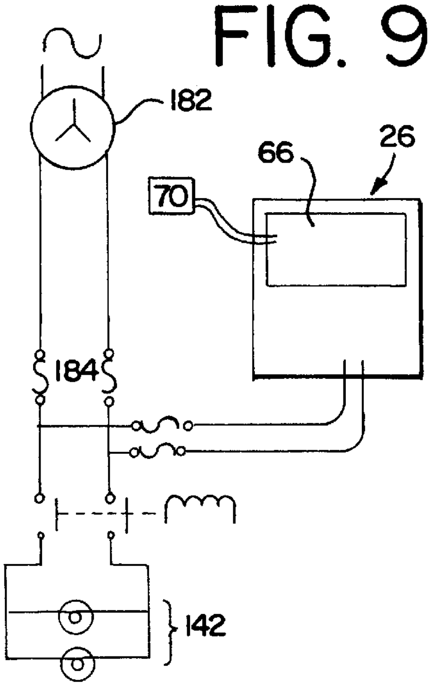
FIG. 9 is a simplified schematic diagram of the alternating current sensor module preferably used with each remote unit of the present invention.
Figure 10:
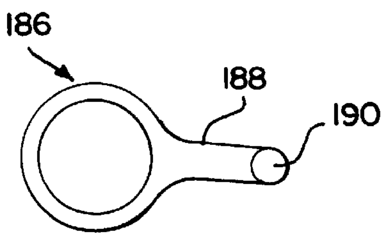
FIG. 10 refers to a personal identification data button for use in conjunction with the control and monitoring system of the present invention.

As shown in the Figures, the remote units 26 detect power failures by implementing an AC sensor module 70. Referring now to FIG. 9, the AC sensor module 70 is shown in schematic form. The AC sensor module 70 mounts between the meter 182 and a circuit breaker 184. The logic box 66 sends current to the module 70 and measures the electrical field surrounding it. To obviate any fluctuation in the AC magnetic field, the preferred embodiment of the present invention measures this field six times over a set period of time. If the module 70 detects an electrical field during any of those measurements, then the failure condition was caused by a trip condition of the attached circuit breaker and service personnel may be sent to the site to remedy the failure. Otherwise, the failure condition was caused by a loss of power in the utility line and may involve more complicated problems.

In another feature of the present invention, when the back up power supply battery 72 loses its charge, a signal is sent to the host computer 22 indicating this failure. In this state, the logic unit 66 will typically have only enough power to keep its internal clock running, to maintain the data in its memory and to perform a few of its basic operating functions. Although the battery 72 continues to supply power for the unit, the unit does not respond to pages or communicate with the host computer. Nevertheless, based on the notification signal, service personnel may be dispatched to remedy the problem.

In another feature of the present invention, after a failure of an operating condition has been determined and located by the unit, such as an inoperative bulb in the case of use of the system in a signboard application, a worker or serviceman is sent to the site. Once there, he can press the service button 90, causing all relays within the unit to close and activate the electrical apparatus for one hour. The serviceman can then determine which apparatus has failed and remedy the problem by opening the circuit breaker, replacing the apparatus, and then closing the breaker.

As another useful feature of the present invention, customers are able to know whether service personnel have performed work they have contracted to perform at the site in a timely manner. Quality control of service performance is often a concern of customers, particularly those in the signboard advertising industry. The present invention contemplates a fail-proof quality control feature. To ensure work is done as contracted for, or service has been completed, the present invention will relay such information back to the host computer 22 in real time. This is accomplished through the use of bar codes as well as data stored on a personal ID touch button and data readers. Typically, a signboard service provider will carry with him a personal ID data button as well as a wand that operates both as a bar code and a button data reader. When the service has been performed in accordance with the contract, the service provider transmits the encoded information on his personal button to the wand by touching the button to the wand. This encoded information is then temporarily stored in the wand. The service provider then touches the wand to a data button located at the work site. Upon doing so, information regarding the location of the work site is transmitted to the memory unit contained within the wand. That location information is encoded in each of the data buttons located at each of the work sites. After completing the job, the service provider then scans the bar code located on the sign with the wand to store the signboard information. Any additional information may also be read by the wand. Finally, the service provider touches the wand to the touch button 196 located on the remote unit 26. The logic box 66 may then download this information to host computer 22 so that customers may be assured the work was performed according to the contract. All of this information is then sent to the host computer 22.

This particular feature may be best understood by the use of an example in conjunction with FIGS. 10–13. Service personnel carry with them a personal identification data button like that shown in FIG. 10 which holds all of their work related data. This information may include their name, ID number, and any other such information. Typically, this data button 186 may be integral with a tab 188 and loop 190 so as to easily attach to a keychain, for example.

Figure 11:
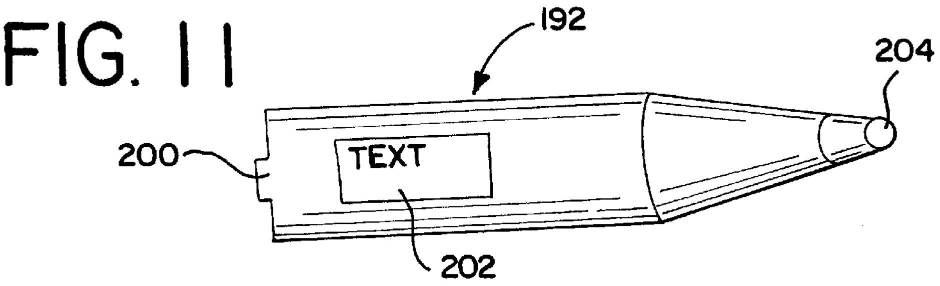
FIG. 11 refers to a service wand for use in conjunction with the control and monitoring system of the present invention.
Figure 12:
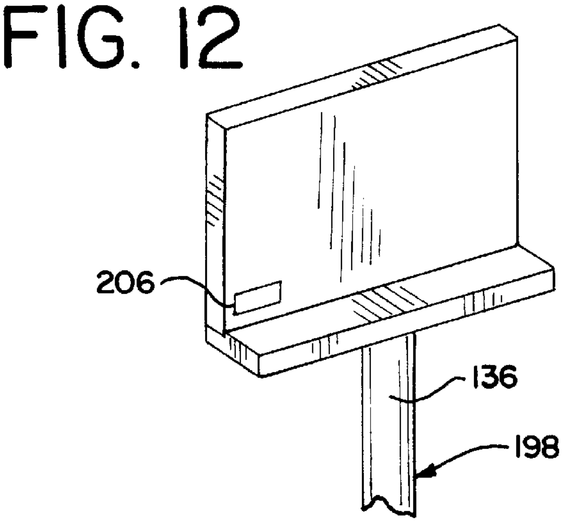
FIG. 12 refers to a load located at a remote unit site for use in conjunction with the control and monitoring system of the present invention.
Figure 13:
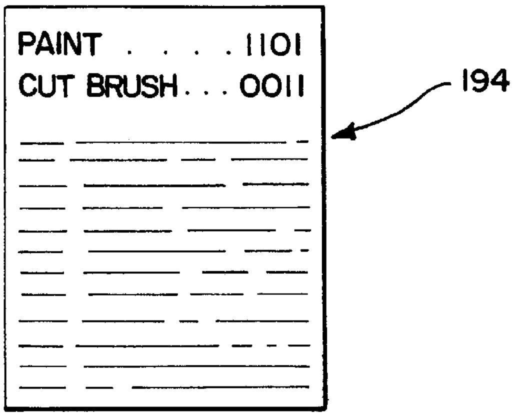
FIG. 13 refers to a work order for use in conjunction with the control and monitoring system of the present invention.

When service needs to be performed at an electrical apparatus site, the service personnel are directed to such location and will bring the service wand 192 depicted in FIG. 11 as well as any other needed supplies such as the work order 194 shown in FIG. 13. Each site will have at least two data buttons, one on the housing 64 of the remote unit 26 (data button 196), and one at the site of the load (data button 198 on the pole 136 as in FIG. 12, for example).

Examples for which wand 192 may be used in the signboard application include changing the sign on a particular signboard, cutting the grass around the pole of the signboard, and painting the pole. A serviceman will arrive at the site and touch his personal ID data button 186 to an end 200 of the service wand 192. This transfers his personal data into the wand, and may be displayed in the text window 202 of the wand. The serviceman then touches the end 200 to data button 198 associated with the pole so as to transfer location data to the wand 192. After the sign is changed, the tip 204 of the wand 192 reads the bar code 206 on the sign and transfers this data to the wand 192. The serviceman then paints the pole and cuts the brush, and touches the tip 204 to the appropriate bar code placed on the work order 194 shown in FIG. 13. This transfer of data need not be performed in this order, but may be performed in any order as long as all of the data eventually is read into wand 192. Thereafter, the serviceman touches the end 200 of wand 192 to the data button 196 of the remote unit 26, and all of the data is transferred to the unit. This data may then be transferred to the host computer 22 so that a customer is able to know when, where and by whom a work order was performed.

While particular embodiments of the invention have been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

What is claimed is:

1. A system for controlling, monitoring, and collecting data from devices, comprising;

a host computer including an internal memory for storing a plurality of protocols for a plurality of applications, said computer having means for selecting one of said protocols corresponding to one of said applications and further including means for sending a text message to remote units associated with each of said devices as determined by said selected protocol, said host computer further including means for receiving a text message;

a customer interface capable of full-duplex communication with said host computer thereby having the ability to provide control of their applications and further having the ability to receive signals indicative of operational parameters of said devices;

a remote unit associated with each of said devices for controlling, monitoring, and collecting data including said selected protocol, said unit further having means for sending a text message to said host computer, said unit further including means for receiving a text message from said computer.

2. A system for the controlling, monitoring, and collecting data from electrical devices as defined in claim 1 wherein said means for sending a text message includes a protocol comprising a first and a second layer, said first layer being application independent and said second layer being application dependent.

3. A system for the controlling, monitoring, and collecting data from electrical devices as defined in claim 1 wherein said means for receiving a text message comprise a protocol having a first and a second layer, said first layer being application independent and said layer being application dependent.

4. A system for controlling, monitoring, and collecting data from electrical devices as defined in claim 3 wherein said unit includes a relay.

5. A system for controlling, monitoring, and collecting data from electrical devices as defined in claim 3 wherein said unit includes and AC current sensor.

6. A system for controlling, monitoring, and collecting data from electrical devices as defined in claim 3 wherein said unit included a stand-by battery.

7. A system for controlling, monitoring, and collecting data from electrical devices as defined in claim 1 wherein said unit includes a logic circuit which automatically calculates for changes in the diurnal cycle.

8. A system for controlling, monitoring, and collecting data from electrical devices as defined in claim 1 wherein said unit includes an antenna and a cover integral with said housing adapted to shield said antenna.

9. A system for controlling, monitoring, and collecting data from electrical devices as defined in claim 1 wherein said host computer polls said logic circuit current, said logic circuit current responds to said host computer and said host computer determines the status of said load for said device.

10. A system for the controlling, monitoring, and collecting data from electrical devices as defined in claim 1 wherein said logic circuit includes a calibration button for determining a maximum stable load current value.

11. A system for the controlling, monitoring, and collecting data from electrical devices as defined in claim 5 wherein said AC current sensor samples an electrical field between a meter and a circuit breaker associated with said device.

12. A system for the controlling, monitoring, and collecting data from electrical devices as defined in claim 1 wherein said logic circuit includes a service button for providing current to as associated load for a predetermined period of time.

13. A system for controlling, monitoring, and collecting data from electrical devices as defined in claim 1 wherein said housing includes a data port.

14. A system for controlling, monitoring, and collecting data from electrical devices as defined in claim 13 further including a data wand, said wand being capable of reading a bar code and a data port, said wand further being capable of transferring data to said data port on said housing.

15. A system for controlling, monitoring, and collecting data from devices, comprising;

a host computer including an internal memory for storing a plurality of protocols for a plurality of applications, said computer having means for selecting one of said protocols corresponding to one of said applications and further including means for sending a text message to remote units associated with each of said devices as determined by said selected protocol, said sending means includes a protocol comprising a first and second layer, said first layer being application independent and said second layer being application dependent, said host computer further including means for receiving a text message, said receiving means includes a protocol having a first and a second layer, said first layer being application independent and said second layer being application dependent;

a customer interface capable of full-duplex communication with said host computer thereby having the ability to provide control of their applications and further having the ability to receive signals indicative of operational parameters of said devices;

a remote unit associated with each of said devices for controlling, monitoring, and collecting data including said selected protocol, said unit further having said means for sending a text message to said host computer, said unit further including means for receiving a text message from said computer.

16. A system for the controlling, monitoring, and collecting data from electrical devices, wherein said unit includes a relay, on AC current sensor, and a stand-by battery.

* * * * *